United States Patent [19]

Raymer

[11] Patent Number: 4,901,947
[45] Date of Patent: Feb. 20, 1990

[54] REVERSE ENGINE VSTOL

[75] Inventor: Daniel P. Raymer, Sylmar, Calif.

[73] Assignee: Lockheed Corporation, Calabasas, Calif.

[21] Appl. No.: 316,210

[22] Filed: Feb. 27, 1989

[51] Int. Cl.[4] .............................................. B64C 29/04
[52] U.S. Cl. .................................. 244/12.5; 244/53 B; 244/55
[58] Field of Search ................. 244/23 B, 23 D, 12.1, 244/12.3, 12.4, 12.5, 53 B, 55, 110 B

[56] References Cited

U.S. PATENT DOCUMENTS

| | | | |
|---|---|---|---|
| 2,912,188 | 11/1959 | Singelmann et al. | 244/12 |
| 3,155,342 | 11/1964 | Bolkow et al. | 244/12 |
| 3,178,887 | 1/1963 | Wilde et al. | 60/35.55 |
| 3,416,754 | 12/1968 | Pinaire et al. | 244/55 |
| 3,528,247 | 3/1968 | Riemerschmid | 60/232 |
| 3,703,266 | 11/1972 | Lincks et al. | 244/52 |
| 3,874,620 | 4/1975 | Kahler et al. | 244/110 |
| 4,171,112 | 10/1979 | Harvey | 244/12.5 |
| 4,248,041 | 2/1981 | Wilde et al. | 60/226 |
| 4,482,108 | 11/1984 | Bradfield et al. | 244/12.5 |
| 4,492,353 | 1/1985 | Phillips | 244/12.4 |

FOREIGN PATENT DOCUMENTS 1270415 6/1968 Fed. Rep. of Germany ........ 244/55

Primary Examiner—Joseph F. Peters, Jr.
Assistant Examiner—C. Ellis
Attorney, Agent, or Firm—L. L. Dachs

[57] ABSTRACT

The invention is a short/vertical takeoff and landing aircraft. In detail, it comprises an airframe having aerodynamic lift and flight control surfaces. An engine is mounted in the airframe in a reversed position having the inlet facing toward the rear of the aircraft and the exhaust nozzle assembly, having a pair of exhaust nozzles, facing toward the front. The exhaust nozzles extend outward from the sides of the aircraft and are rotatable from a vertically downward position to provide upward thrust to a horizontally rearward direction to provide forward thrust. The thrust axis when in the vertical position is approximately through the center of gravity. A generally U-shaped engine inlet duct is mounted in the airframe having an inlet opening facing forward and an outlet coupled to the inlet of the engine.

5 Claims, 3 Drawing Sheets

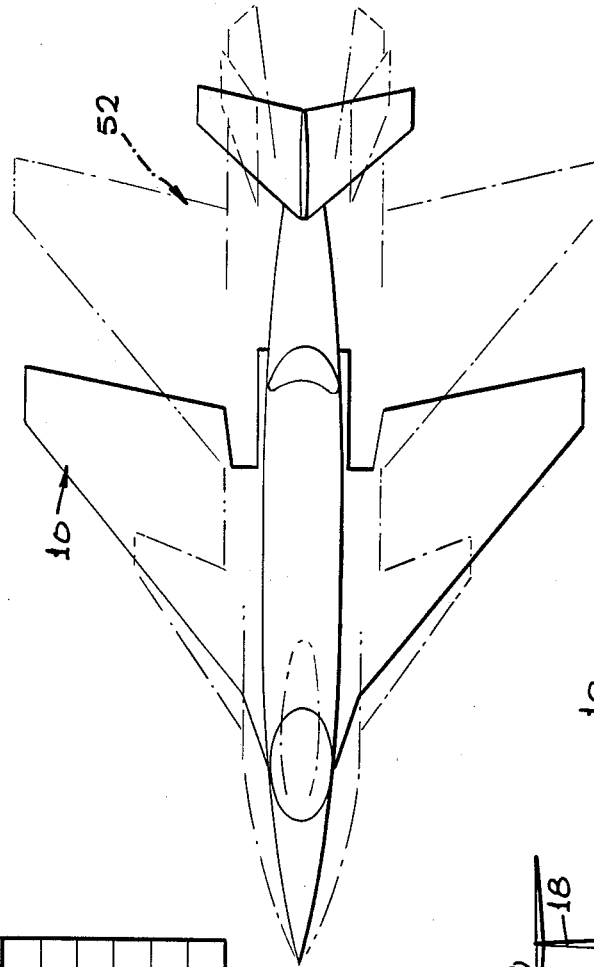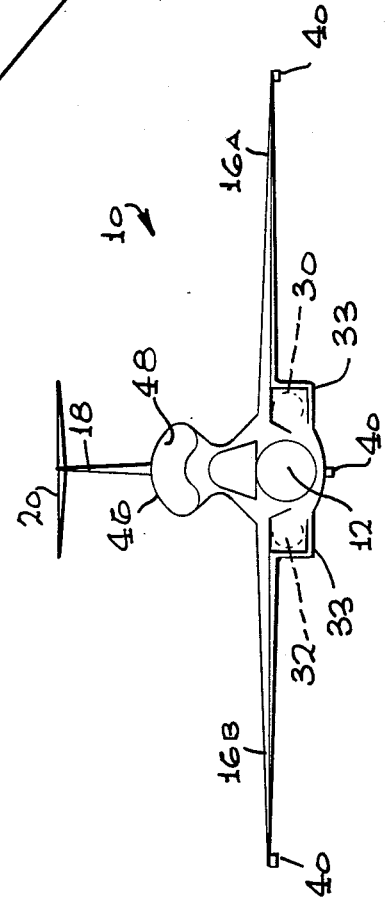
| COMPONENT VOL. (FT.3) | TANDEM FAN VTOL | REV ENGINE |
|---|---|---|
| ENGINE | 221.4 | 55.1 |
| INLET DUCT | 118.8 | 97.9 |
| NOZZLE/DUCT | 46.1 | 36.4 |
| TOTAL | 386.3 | 189.4 |
| FWD. OF CG | 252.4 | 0.0 |
| AFT OF CG | 133.9 | 189.4 |
FIG. 5

FIG. 6
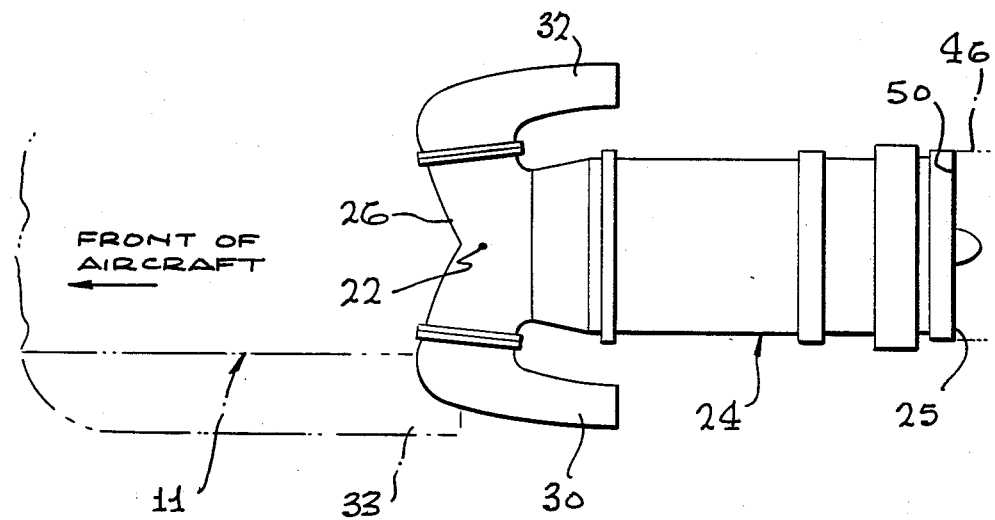
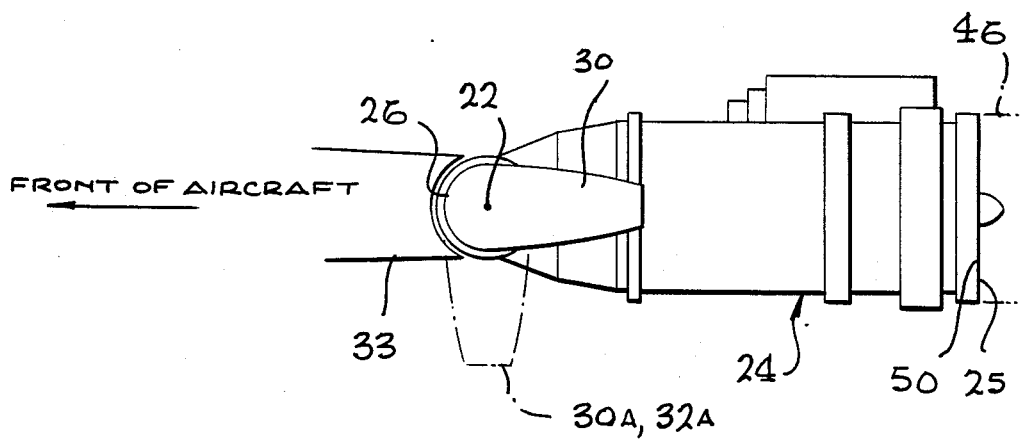
FIG. 7

REVERSE ENGINE VSTOL

TECHNICAL FIELD

The invention relates to the field of VSTOL and VTOL aircraft and, in particular, to an aircraft having an engine position which improves the overall performance of the aircraft while reducing its size in comparison to conventional aircraft.

BACKGROUND INFORMATION

The operational benefits of an ability to takeoff and land vertically are self evident. Conventional aircraft must operate from a relatively small number of airports or airbases with long paved runways. For commercial transportation, the airport is rarely where you actually wish to go, and is usually crowded causing delays in the air and on the ground. For military aircraft the airbase is vulnerable to attack, and the time expended crusing to and from the in-the-rear airbase increases the necessary range of the aircraft increases the response time.

The first type of heavier-than-air aircraft to takeoff and land vertically was the helicopter. While the helicopter rapidly proved its worth for rescue operations and short range point-to-point transportation, its inherent speed and range limitations have restricted its applications.

In the area of propeller-powered aircraft, the tilt-rotor concept, as tested in the Bell XV-15, seems to offer the best compromise between helicopter-like vertical flight and efficient wing-borne cruise. The tilt-rotor concept is the basis of the V-22 Osprey which is currently under development.

To date, there have only been a few operational jet VTOL designs, the British Harrier and the Russian YAK-36, both of which are subsonic aircraft. While at least one supersonic VTOL design has flown, the Mach 2 Mirage III-V back in 1966, there has yet to be an operational supersonic VTOL aircraft.

This is largely due to the need for increased internal volume for the vertical lift apparatus and fuel capacity. Also, most concepts for vertical lift tend to increase the aircraft's cross-sectional area near the aircraft's center of gravity, increasing the supersonic wave drag. Finally, the state of the art in engine thrust-to-weight ratio has imposed an excessive weight penalty on VTOL designs. It has simply been impossible, up to now, to provide an operational aircraft having both vertical and supersonic forward flight with any practical range.

Like most technical subjects, the area of vertical flight has spawned its own arcane terminology. VTOL refers to a capability for Vertical TakeOff and Landing, as opposed to Conventional TakeOff and Landing (CTOL). VTOL is the broadest terminology and can be applied equally well to a helicopter or an Apollo space capableaircraft which has the flexibility to perform either vertical or short takeoffs and landings is said to have VSTOL capability (Vertical or Short TakeOff and Landing). An aircraft which has insufficient lift for vertical flight at takeoff weight but which can land vertically at a reduced weight is called a STOVL (Short TakeOff and Vertical Land).

There are a number of unique problems associated with the design and operation of jet VTOL aircraft. Two fundamental problems stand out because they tend to have the greatest impact upon the selection of a VTOL propulsion concept and upon the design and sizing of the aircraft. These are the problems of balance and of thrust matching.

Modern supersonic jet fighters have a thrust-to-weight ratio exceeding one, so it would seem fairly easy to point the jet exhaust downward and, therefore, attain vertical flight at "no cost". Unfortunately, this is complicated by the balance problem. Many subsonic jets and virtually all supersonic jets are designed with the engine at the rear, the cockpit and avionics at the nose and the payload and fuel near the center of the aircraft. This traditional layout places the expendables at the center of gravity, co-locates the parts of the aircraft requiring cooling (crew and avionics), and keeps the avionics away from the hot and vibrating engine.

If the thrust exceeds the weight, vertical flight could be obtained simply by deflecting the thrust downwards. However, some vertical upward force is required forward of the aircraft's center of gravity. In order to balance the vertical thrust force at the tail. This balance problem is possibly the single most important problem encountered in the design of a VTOL jet fighter.

There are two conceptual approaches to solving the balance problem. Either the thrust location must be moved to the center of gravity, or an additional thrust force has to be applied near the nose. Both of these approaches will tend to move the design of the aircraft away from the optimal layout. Generally, jet VTOL concepts can be divided into those which utilize fairly conventional engines and those which use modified engines so that the fan and core air are split, with the fan air ducted and exhausted from some location separate from the core air.

The conventional engine VTOL concepts which do not use additional lift engines for vertical flight must have a net takeoff thrust-to-weight ratio in excess of one. If the jet exhaust is not diverted to some other location for vertical flight, the aircraft must either be a tail sitter (VATOL), or it must have the engine exhaust located at the aircraft center of gravity and capable of vectoring downward for vertical flight. This can be accomplished by using a vectoring nozzle or nacelles which tilt.

The X-14 research aircraft had vectoring nozzles at the center of gravity, with the engines out in front. This is probably not a good arrangement for most applications because the cockpit winds up in the rear for balance, which does not provide acceptable visibility for the pilot. Also, in forward flight, the jet exhaust scrubs alongside the fuselage which causes thermal and acoustic problems.

Tilt nacelles are heavy, but may be the best compromise for some applications. Grumman Aircraft Corporation has been pursuing a tilt-nacelle concept for Naval applications for a number of years.

Some VTOL concepts provide a means of diverting the exhaust flow to provide vertical lift. This is generally done by a retracting blocker device in the engine which shuts off the flow through the rearward-facing nozzle. The flow is then diverted forward through internal ducting. All of these VSTOL approaches, however, exact significant penalties in weight, cost, and completely when compared to a conventional jet aircraft design.

Therefore, it is a primary object of the subject invention to provide VSTOL or VTOL aircraft having a minimum increase in size and weight when compared to a conventional supersonic aircraft designed for a similar mission.

It is another object of the subject invention to provide a VSTOL or VTOL aircraft having a propulsion system located in the aft portion of the aircraft as in a conventional aircraft.

A further object of the subject invention is to provide a VSTOL or STOL aircraft, wherein the exhaust nozzles for both vertical and horizontal flight are located at the center of gravity of the aircraft.

Disclosure of the Invention

The invention is a reverse engine VSTOL or STOL aircraft. The invention comprises an airframe having conventional aerodynamic flight control surfaces such as wings, vertical stabilizer (rudder), horizontal stabilizers, etc. The main propulsion engine which will provide both vertical and horizontal propulsion forces is mounted in the airframe in a reversed position aft of the center of gravity, with the engine front face facing to the rear and the exhaust nozzle assembly located at the center of gravity. The nozzle assembly is comprised of a pair of exhaust nozzles, one mounted on each side of the airframe, in the form of 90 degree "elbows", which can be rotated from a vertically downward facing position to a horizontally rearward facing direction. A generally U-shaped engine inlet duct is mounted in the airframe having an inlet opening facing forward, an outlet coupled to the inlet of the engine and making a 180 degree turn therebetween. Preferably, the inlet opening of the inlet duct is located at the top of aircraft. However, it could be located at the bottom of the aircraft or, in fact, split inlet ducts having the inlet openings thereto located on the sides of the aircraft is a viable alternative.

Such a reversed engine configuration places the engine in an aft fuselage location, while ducting the thrust to the aircraft center of gravity. This configuration contributes considerably to the reduction of overall propulsion system size and complexity. The compactness of the reversed engine propulsion system, as compared to a hybrid fan propulsion system, reduces the size and weight of the aircraft. In general, the utilization of the reversed engine results in a minimum size and weight aircraft.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a planform view of an aircraft having a reversed engine mounted therein.

Illustrated in FIG. 2 is a side elevation view of the aircraft shown in FIG. 1.

Figure 1:
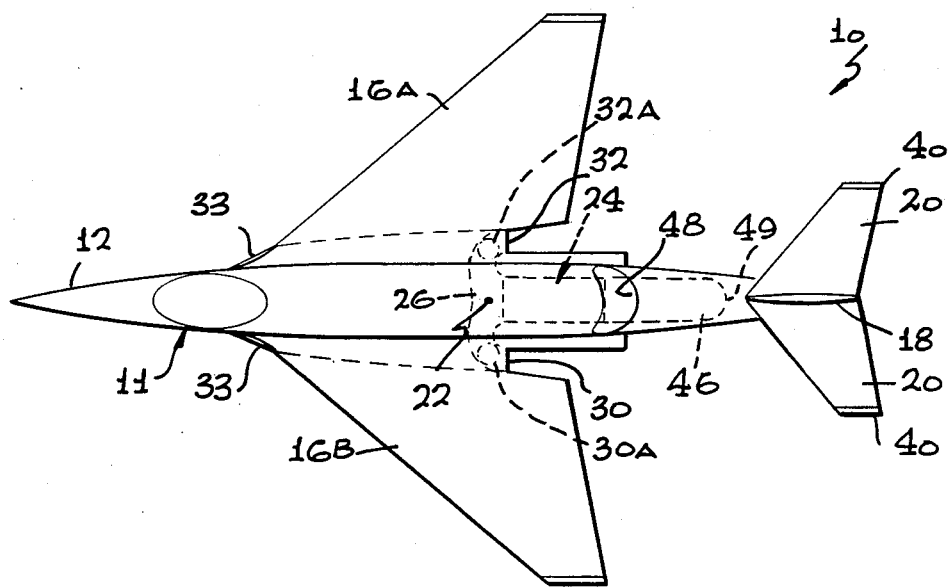

Illustrated in FIG. 3 is a front view of the aircraft shown in FIG. 1.

Illustrated in FIG. 4 is another planform view of the aircraft incorporating the reversed engine concept with an overlay of a tandem-fan VTOL aircraft having the same mission capabilities.

Illustrated in FIG. 5 is a chart comparing the weight and size of the two aircraft shown in FIG. 4, the subject aircraft and a conventional aircraft.

Illustrated in FIG. 6 is an enlarged view of the engine shown in FIG. 1.

Figure 2:
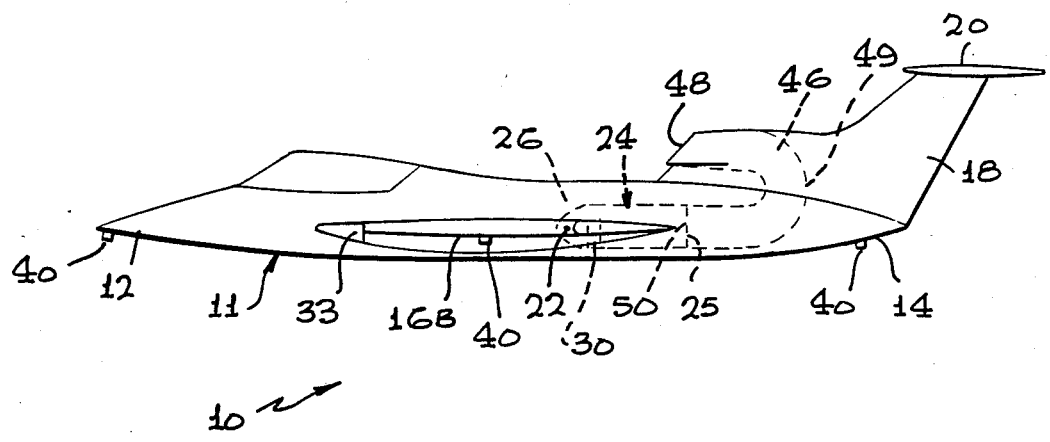

Illustrated in FIG. 7 is an enlarged view of the engine shown in FIG. 2.

BEST MODE FOR CARRYING OUT THE INVENTION

Illustrated in FIGS. 1 through 3 are planform, side elevation and front views of a supersonic VTOL aircraft incorporating a reversed engine. In detail, the aircraft, generally designed by numeral 10, includes an airframe 11, having a nose 12, tail 14, wings 16A and 16B, rudder or vertical stabilizer 18 and horizontal stabilizer 20. The center of gravity is indicated by numeral 22. A thrust vectoring turbojet engine, indicated by numeral 24, is located in a reversed position aft of the center of gravity 22, i.e., the engine front face 25 facing toward the tail 14 and a thrust vectoring nozzle assembly 26 facing forward towards the nose 12. The nozzle assembly 26, for illustration purposes, is similar to that used on the Rolls Royce Pegasus engine for the British Harrier VTOL aircraft, while the engine is a typical advanced fighter aircraft engine. However, it must be understood that other thrust vectoring nozzle assemblies can be used as well as other turbojet or turbofan engines. The nozzle assembly 26 incorporates swiveling 90 degree nozzles 30 and 32, which extends into nozzle nacelles 33, dividing the thrust to each side of the aircraft. The nozzles 30 and 32 can be rotated from the horizontal rearward direction as illustrated in solid lines to the vertical position for vertical flight, shown in dotted lines and indicated by numerals 30A and 32A. Of course, other thrust vectoring exhaust nozzles, such as jet flaps, can be used. Additionally, conventional reaction control thrusters 40 can be located at the wing tips, nose and tail of the aircraft to provide control in vertical flight. These are also conventional in design, such as thrusters making use of bleed air from the compressor of the engine 24, and thus, are not discussed further in significant detail.

An engine inlet duct 46 is included having an inlet opening 48 at the top of the aircraft and which bends the airflow approximately 180 degrees at its center 49 and connects to the engine at its end 50. Please note that while in the configuration illustrated, the inlet opening 48 of the inlet duct is located on top of the aircraft, it could just as well be located at the bottom thereof or at split duct with inlets on either side of the aircraft.

While those skilled in the art will realize that having an inlet turning a full 180 degrees incurs energy losses, however, this is more than offset by the reduction in overall weight and size of the aircraft. This can be readily seen in FIG. 4, which is another planform view of the aircraft 10 with a tandem fan VTOL aircraft, indicated by dotted lines and numeral 52, designed for this same mission and performance, overlayed thereon. The size and weight comparisons of major portions of the aircraft 10 compared to the conventional VTOL 52 are presented in FIG. 5.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The invention is applicable to aircraft and, in particular, to VSTOL and STOL aircraft.

I claim:

1. A vertical takeoff and landing aircraft comprising:
   an airframe having aerodynamic lift and flight control surfaces;
   an engine mounted in said airframe aft of the center of gravity of the aircraft having a front face facing towards the rear of the aircraft and an exhaust nozzle means located generally at said center of gravity of the aircraft, said nozzle means comprising a pair of exhaust nozzles rotatably mounted to the engine, rotatable from a vertically downward position to a horizontal rearward facing position; and
   an engine inlet duct means mounted in said airframe having an inlet opening facing toward the front of the aircraft and an outlet coupled to said front face of said engine.

2. The aircraft as set forth in claim 1, wherein said inlet opening of said inlet duct is mounted at the top of the aircraft.

3. The aircraft as set forth in claim 1 or 2, wherein said pair of nozzles are located on each side of said airframe.

4. The aircraft as set forth in claim 3, wherein said pair of nozzles are generally in the shape of 90 degree elbows.

5. The aircraft as set forth in claim 4, wherein said inlet duct means comprises a generally U-shaped engine inlet duct.

* * * * *